United States Patent
Konno et al.

(10) Patent No.: US 8,454,462 B2
(45) Date of Patent: Jun. 4, 2013

(54) CHAIN GUIDE MECHANISM

(75) Inventors: Masahiko Konno, Osaka (JP); Kaori Mori, Osaka (JP); Yuji Kurematsu, Osaka (JP); Akira Kobara, Osaka (JP); Manabu Hirayama, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 333 days.

(21) Appl. No.: 12/915,226

(22) Filed: Oct. 29, 2010

(65) Prior Publication Data
US 2011/0105258 A1    May 5, 2011

(30) Foreign Application Priority Data

Nov. 4, 2009  (JP) .................. 2009-253032

(51) Int. Cl.
*F16H 7/18* (2006.01)
*F16H 7/08* (2006.01)
(52) U.S. Cl.
USPC .......................................... 474/111; 474/140
(58) Field of Classification Search
USPC .................. 474/111, 140, 101, 109
See application file for complete search history.

(56) References Cited

U.S. PATENT DOCUMENTS

| 1,108,085 | A  | * | 8/1914 | Sewall ............. 474/109 |
| 6,106,423 | A  | * | 8/2000 | White et al. .......... 474/109 |
| 6,358,169 | B1 |   | 3/2002 | Markley |
| 6,743,131 | B1 | * | 6/2004 | Walker ............. 474/134 |
| 7,097,579 | B2 | * | 8/2006 | Markley ............. 474/111 |
| 7,390,276 | B2 | * | 6/2008 | Tryphonos ............ 474/109 |
| 7,815,533 | B2 | * | 10/2010 | Vrsek et al. ............ 474/111 |
| 2002/0160868 | A1 |   | 10/2002 | Wigsten et al. |
| 2011/0077114 | A1 | * | 3/2011 | Markley ............. 474/111 |

FOREIGN PATENT DOCUMENTS

JP          11-063128          3/1999

* cited by examiner

*Primary Examiner* — Sang Kim
*Assistant Examiner* — Dorin Cojocariu
(74) *Attorney, Agent, or Firm* — Howson & Howson LLP

(57) ABSTRACT

In a chain guide mechanism, fixed and movable guides are attached to a guide bridge by cooperation of bosses on the guides with boss-receiving holes formed in spaced-apart elements of arms of the bridge. A fixed guide is held against rotation by cooperation of a projection on its mounting boss with a notch in a boss-receiving hole in a guide bridge arm element. A base, extending from an intermediate location at which the arms come together has a pressing structure that engages bosses on a driving sprocket, and a groove for receiving teeth of the driving sprocket.

3 Claims, 12 Drawing Sheets

PRIOR ART

PRIOR ART

CHAIN GUIDE MECHANISM

CROSS REFERENCE TO RELATED APPLICATION

This application claims priority under Title 35, United States Code, §119 on the basis of Japanese Patent Application No. 2009-253032, filed on Nov. 4, 2009. The disclosure of Japanese Patent Application No. 2009-253032 is herein incorporated by reference in its entirety.

FIELD OF THE INVENTION

The invention relates to a chain guide mechanism comprising a plurality of chain guides for sliding engagement with a chain, and a guide bridge for holding the chain guides. The invention relates more specifically to a chain guide mechanism for use in an engine timing drive to guide and maintain tension in an endless timing chain such as a silent chain, a roller chain, or the like engaged in driven relationship with a crankshaft sprocket and in driving relationship with one or more camshaft sprockets within a timing drive compartment, which is typically formed between an engine block and a timing chain cover.

BACKGROUND OF THE INVENTION

FIG. 10 shows a known engine timing drive composed of a chain guide mechanism, a driving sprocket S1 mounted on a crankshaft, a pair of driven sprockets S2 and S3 mounted on valve-operating camshafts, an endless timing chain C engaged with the driving and driven sprockets, a pivoting chain guide 520 for guiding and keeping adequate tension in the timing chain, a tensioner T for exerting a force pressing the guide 520 against the span of the chain traveling from the driving sprocket S1 to driven sprocket S2, and a fixed chain guide 530 in sliding engagement with the span of the chain traveling from driven sprocket S3 to driving sprocket S1 for guiding the travel of the chain. The timing drive is typically disposed within a timing drive compartment (not shown) formed by an engine block and a timing chain cover.

The pivoted chain guide 520 is pivotally mounted on a mounting shaft B fixed to the engine block, and the fixed chain guide 530 is attached to the engine by mounting shafts B1 and B2, which are also fixed to the engine block. In assembly of the timing drive, and in disassembly of the timing drive for maintenance or replacement, the driving sprocket S1, the driven sprockets S2 and S3, the pivoting chain guide 520, the fixed chain guide 530, and the timing chain C, need to be mounted or dismounted individually. Consequently the process of assembly and disassembly is difficult and time-consuming.

To alleviate the aforementioned difficulties in assembly and disassembly of a timing drive, another known timing system has been provided in which the pivoted and fixed chain guides are connected by a guide bridge. As shown in FIG. 11, in the chain guide mechanism 600 of this known timing system, the fixed chain guide 630 is formed as a unit with a guide bridge 610. A mounting hole 612, located adjacent an end of the guide bridge 610 remote from the fixed guide, receives a mounting boss 621 on a pivoted guide 620, which in turn receives a mounting shaft B on the engine block. The mounting shaft B, the boss 621 and the mounting hole 612 form a fulcrum about which the guide 620 pivots.

The guide bridge 610 is formed so that it defines the relative positions of the driving sprocket S1, the driven sprockets S2 and S3 and the pivoting chain guide 620, so that the positioning of these components during assembly or maintenance is simplified. A provisional assembly can be made before the components are mounted on the engine as shown and explained in Japanese laid-open Patent Application No. Hei. 11-63128.

However, while the known chain guide mechanism 600 in FIG. 11 integrates the pivoting chain guide 620 and the fixed chain guide 630, it only defines the relative positional relationships of the driving sprocket S1, the driven sprockets S2 and S3, and the timing chain C. It does not integrally hold the sprockets and chain. Consequently, the improvements afforded by the guide bridge 610 are relatively minor.

Another problem with the guide bridge 620 because the guide bridge 610 that connects the fixed and pivoted guides extends across the timing chain only on the side of the timing chain C remote from the engine block the mounting hole 612 can become disconnected from the boss 621 of the pivoting 620 if the guide bridge 610 deforms in a direction of its thickness, as shown in FIG. 12.

SUMMARY OF THE INVENTION

The chain guide mechanism comprises a plurality of chain guides for sliding relationship with a traveling chain, and a guide bridge for integrally holding the plurality of chain guides. The guide bridge has a base portion, and a pair of arms extending from the base portion. Each of the arms comprises two opposed, spaced parts extending on opposite sides of one of the chain guides whereby a portion of one of the chain guides is disposed between the opposed parts of each of the arms. A pair of cylindrical mounting bosses extends in opposite directions from each said portion of a chain guide, and each of the opposed, spaced parts is formed with a guide mounting hole for receiving a mounting boss on the chain guide portion therebetween.

The structure described above, allows the guide bridge to use short arms which can be light in weight, but are not as easily deformed as longer arms. With the use of short arms, it is possible to prevent the guide mounting holes from being accidentally disengaged from the mounting bosses during operation of the chain drive as well as during assembly and maintenance.

The structure also makes it possible to hold the chain together with the chain guides, and thereby facilitate assembly and maintenance by assembling the chain, guide bridge and guides in advance of installation on an engine block.

One of the chain guides can be provided with a projection on the outer circumference of at least one of its cylindrical mounting bosses, and the guide mounting hole receiving the mounting boss having the projection is formed with a notch that mates with the projection, whereby rotation of the chain guide relative to the guide bridge is prevented. The projection and notch provide a convenient way to mount a fixed chain guide and prevent its rotation, and further facilitate assembly and maintenance.

Each of the opposed parts of each arm of the guide bridge can have a guide deviation preventing projection that projects toward the opposite part of the arm. The deviation preventing projections limit lateral movement of the chain guides relative to the guide bridge, while allowing the opposed arm elements to be sufficiently spaced from each other that the chain guides can be readily attached to the guide bridge. The deviation preventing projections allow for firm attachment of the chain guides to the bridge and at the same time facilitate assembly and maintenance.

If the base portion of the guide bridge and the arms thereof are in the form of a T, the base can have a sprocket pressing structure that comprises a pair of surfaces for engagement with boss portions of a sprocket, and a groove for receiving sprocket teeth separating those surfaces. This structure makes it possible to preassemble the chain guides, the chain, and a sprocket, and to hold the sprocket, chain guides and chain together as a preassembled unit before installation on an engine block.

The base portion of the guide bridge can includes an opening reinforced by ribs extending across the opening. In this way, the guide bridge can be lightened without reducing its strength. Reduction in weight makes it easier to handle the pre-assembled guide mechanism, and thereby further facilitates assembly and maintenance works. The rib-reinforced open structure of the base also makes it possible to reduce deformation and strain during molding and to improve dimensional accuracy.

DETAILED DESCRIPTION OF THE PREFERRED EMBODIMENT

Figure 1:
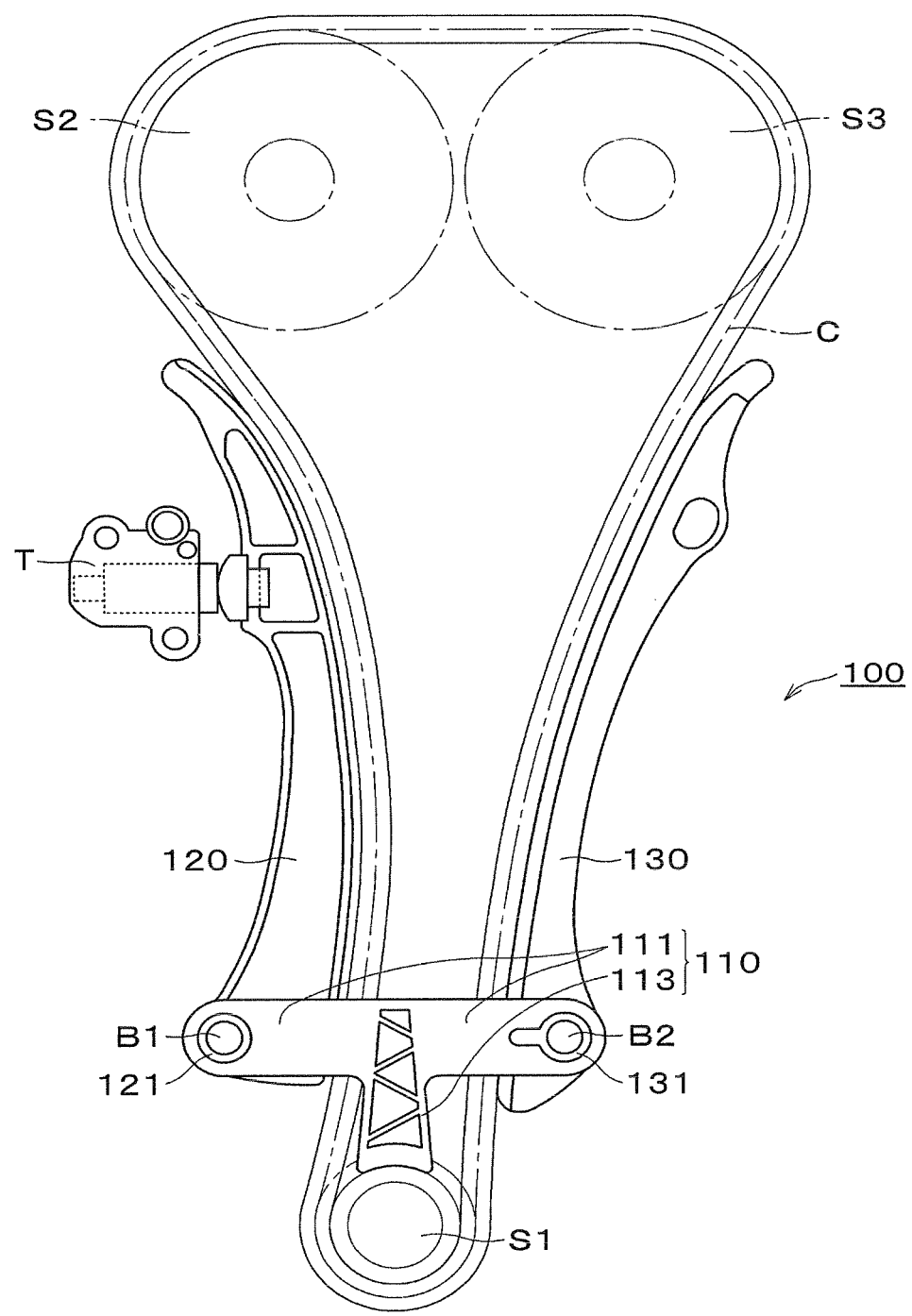
FIG. 1 is a schematic front elevational view of a timing drive incorporating a chain guide mechanism according to the invention.

FIG. 1 shows a chain guide mechanism 100 in an engine timing drive in which an endless timing chain C is engaged with a driving sprocket S1 on an engine crankshaft, and with a pair of driven sprockets, S2 and S3, on valve-operating camshafts. The timing drive is typically housed within a space between the engine block and a timing chain cover.

The chain guide mechanism 100 includes a guide bridge 110 having a pair of arms 111 which extend in opposite directions from a central location, and to which are attached respectively a pivoted chain guide 120, which oscillates with changing tension in the chain C, and a fixed chain guide 130. The bridge also includes a base portion 113 which extends perpendicularly from the oppositely extending arms 111, from the central location between the arms so that the guide bridge is T-shaped. An edge of the base portion 113 of bridge 110 is in close relationship to the driving sprocket S1.

The chain guide mechanism 100 is fixed within the space between the timing cover and the engine block by mounting shafts B1 and B2, which extend respectively into cylindrical bosses 121 and 131 of the movable chain guide 120 and the fixed chain guide 130.

Figure 2:
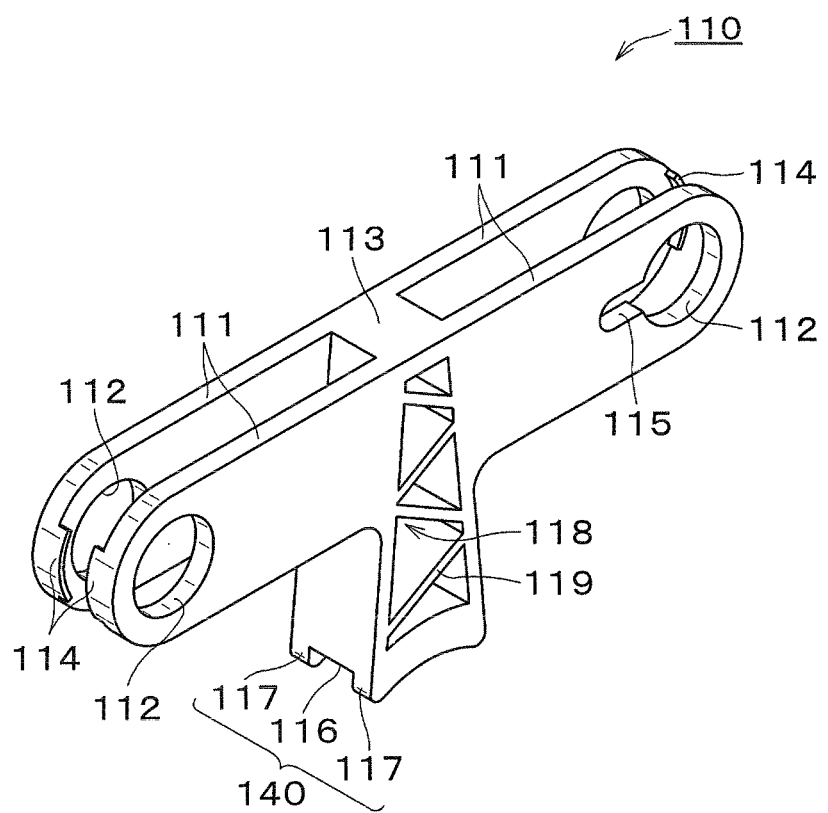
FIG. 2 is a perspective view of a guide bridge of the chain guide mechanism according to one embodiment of the invention.

As shown in FIG. 2, the guide bridge 110 is formed so that each of arms 111 consists of two opposed, spaced parts, both extending in parallel relation to each other from the base portion 113. Guide mounting holes 112 are provided at the ends of the arms 111. The guide mounting holes 112 in both of the opposed, parallel portions of each arm are aligned with each other.

Each of the guide mounting holes 112 to which the fixed chain guide 130 is mounted is provided with a notch 115. Both parts of each arm 111 are provided with projections 114 that protrude toward each other. The purpose of these projections 114 is to prevent lateral deviation of the guides while allowing the opposed parts of the arms to be spaced from each other sufficiently to enable the mounting bosses of the chain guides to be inserted easily into the mounting holes. The projections are provided adjacent the sides of the mounting holes 112 near the outer ends of the arms 111.

The base portion 113 of the guide bridge 110 extends from the center of the part consisting of arms 111, and is provided at its end with a sprocket pressing structure 140, composed of a groove 116 that permits sprocket teeth to pass, and contact surfaces 117, on the both sides of the groove 116, that contact boss portions of the sprocket. The weight of the base portion 113 is reduced without reducing its strength by forming it with an opening 118 reinforced by ribs 119.

Figure 3:
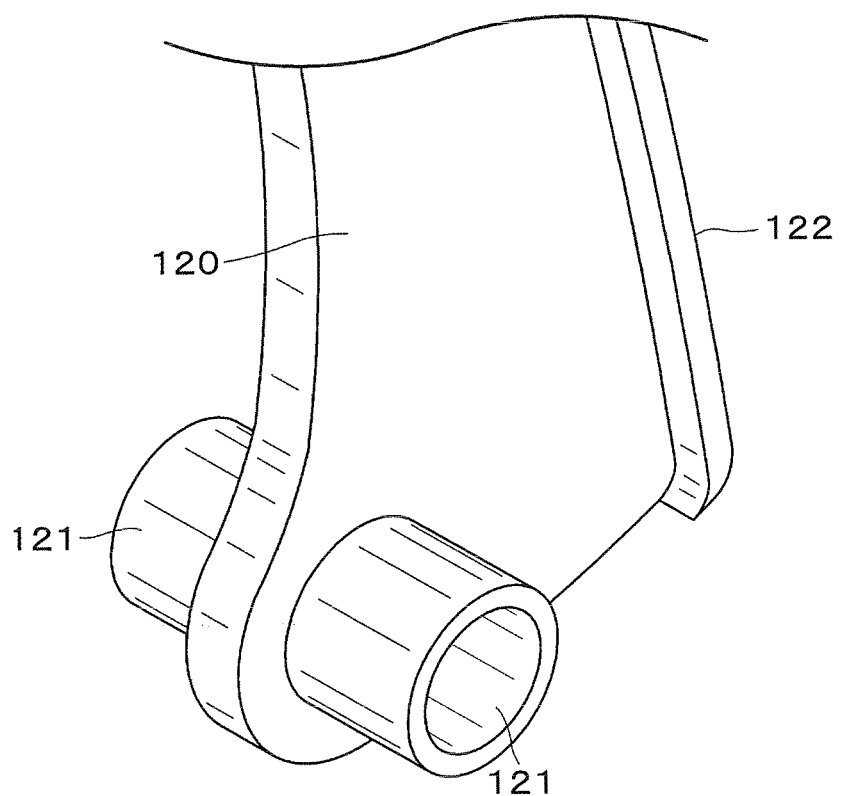
FIG. 3 is a perspective view of the mounting boss portion of a pivoting chain guide in the chain guide mechanism according to one embodiment of the invention.

As shown in FIG. 3, the movable chain guide 120 is provided with cylindrical bosses 121 that protrude in opposite directions widthwise of the guide. The movable chain guide 120 is sandwiched between the opposed parts of an arm 111, and is held by the guide bridge 110 by engagement of its bosses 121 with guide mounting holes 112.

Figure 4:
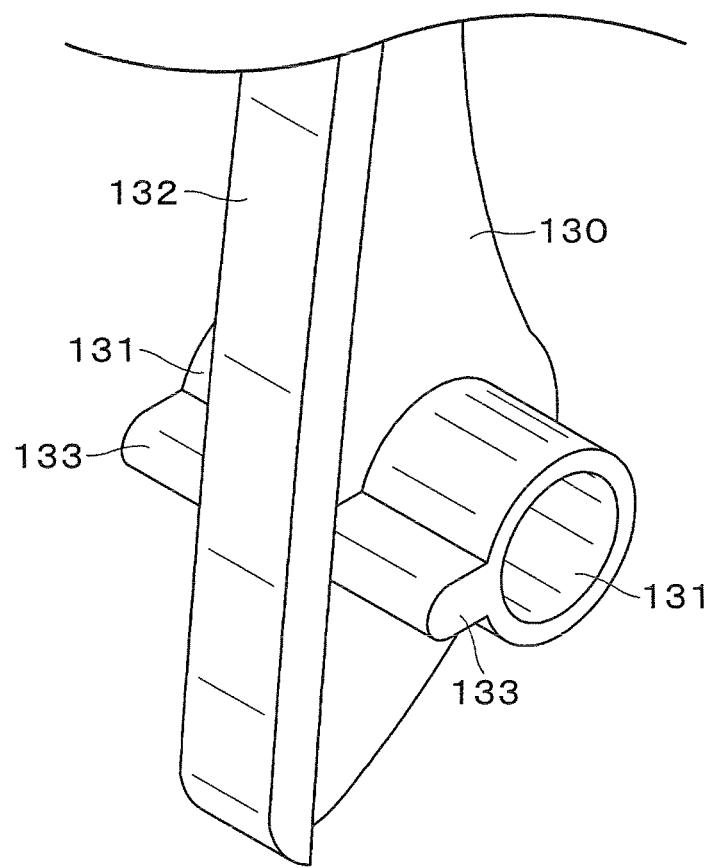
FIG. 4 is a perspective view of a mounting boss portion of a fixed chain guide of the chain guide mechanism according to one embodiment of the invention.

As shown in FIG. 4, the fixed chain guide 130 is also provided with cylindrical bosses 131 that protrude in opposite directions widthwise of the guide. The outer circumferences of the bosses 131 on the fixed guide are formed with projections 133, which fit the notches 115 (FIG. 2) to prevent pivoting motion of the fixed guide. Therefore, the fixed guide 130 is sandwiched between opposed parts of an arm 111, and is fixed against rotation relative to the guide bridge 110 by engagement of its bosses 131 with holes 112, and by engagement of its projections 133 with notches 115.

The deviation preventing projections 114 in the arms 111 of the guide bridge 110 prevent the movable chain guide 120 and the fixed chain guide 130 from deviating laterally, i.e., in the directions of the widths of the chain guiding surfaces 122 and 132 of the movable chain guide 120 and fixed chain guide 130 respectively.

Figure 5:
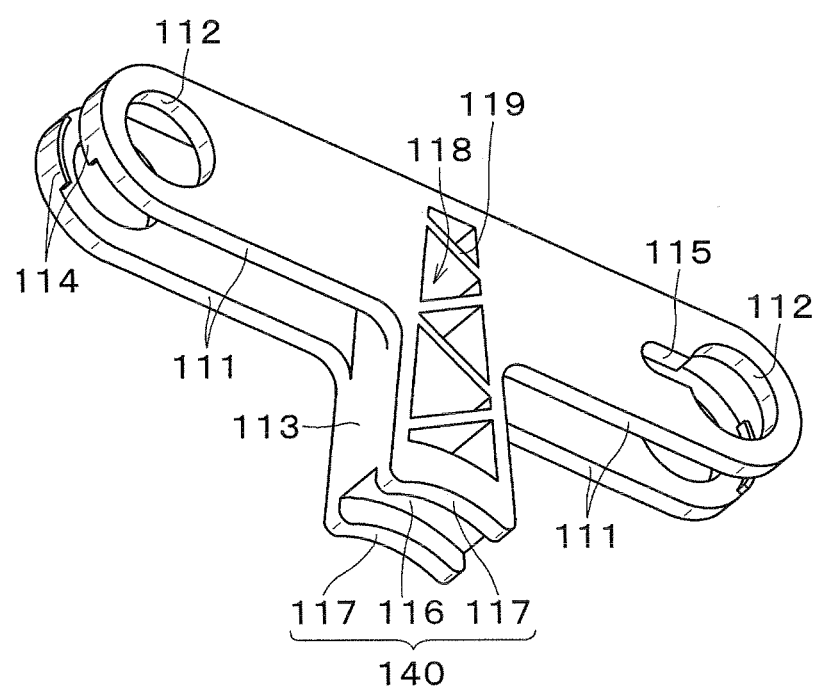
FIG. 5 is a perspective view of the guide bridge of FIG. 2, showing details of the sprocket-receiving portion of the guide bridge.
Figure 6:
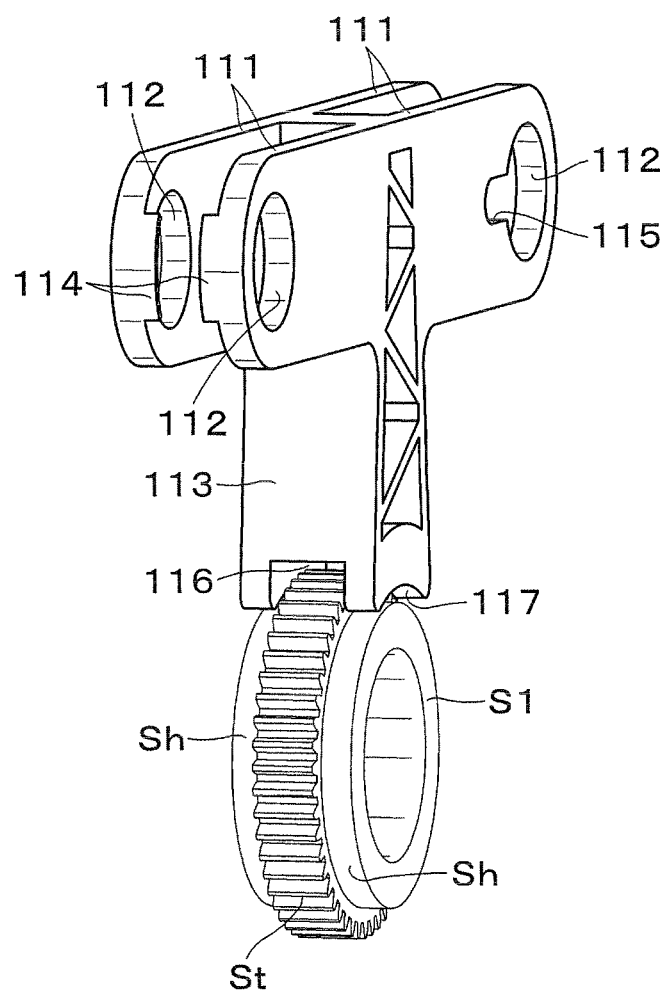
FIG. 6 is a perspective view showing the relationship of the guide bridge of FIGS. 2 and 5 to a driving sprocket.
Figure 7:
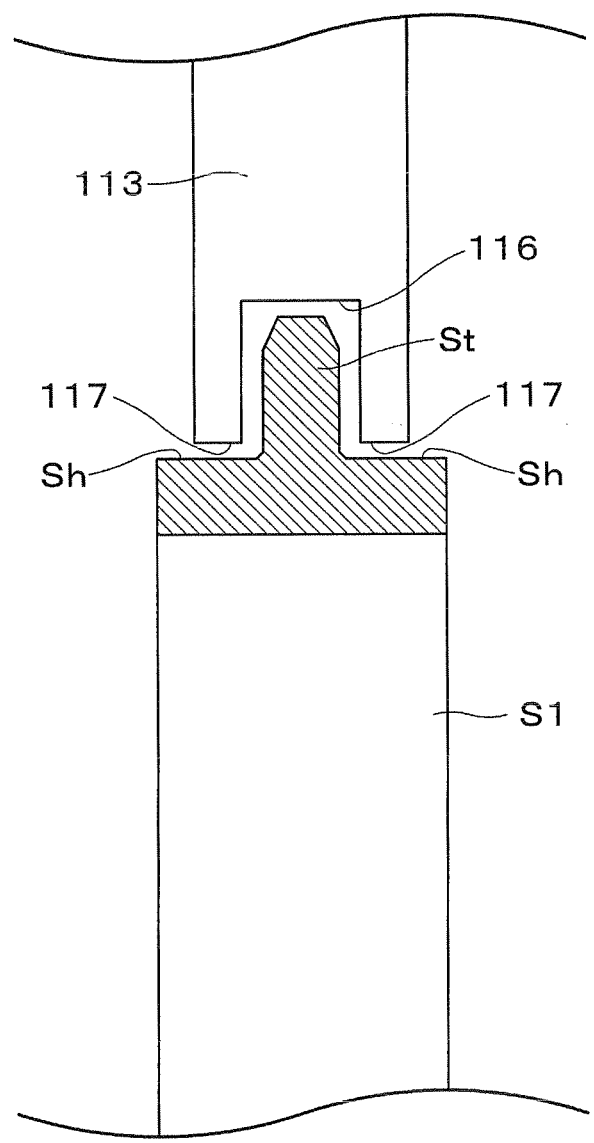
FIG. 7 is a sectional view showing the relationship of the sprocket-receiving part of the guide bridge and the sprocket in FIG. 6.

As shown in FIGS. 5-7, the sprocket pressing structure 140 at the end of the base portion 113 of the guide bridge 110 is composed of a groove 116, through which the teeth St of the driving sprocket S1 pass, and contact surfaces 117, on both sides of the groove 116, that slidably contact the boss portions Sh of the driving sprocket S1. The guide bridge 110 permits chain guide mechanism 100 to be handled integrally with the driving sprocket S1 during assembly and maintenance of the timing system, by abutment of the contact surfaces 117 with the boss portions Sh of the driving sprocket S1. Following assembly, the base portion 113 separates slightly from the bosses of the driving sprocket S1 as shown in FIGS. 6 and 7, so that it does not interfere with the driving sprocket during operation of the engine.

Figure 8:
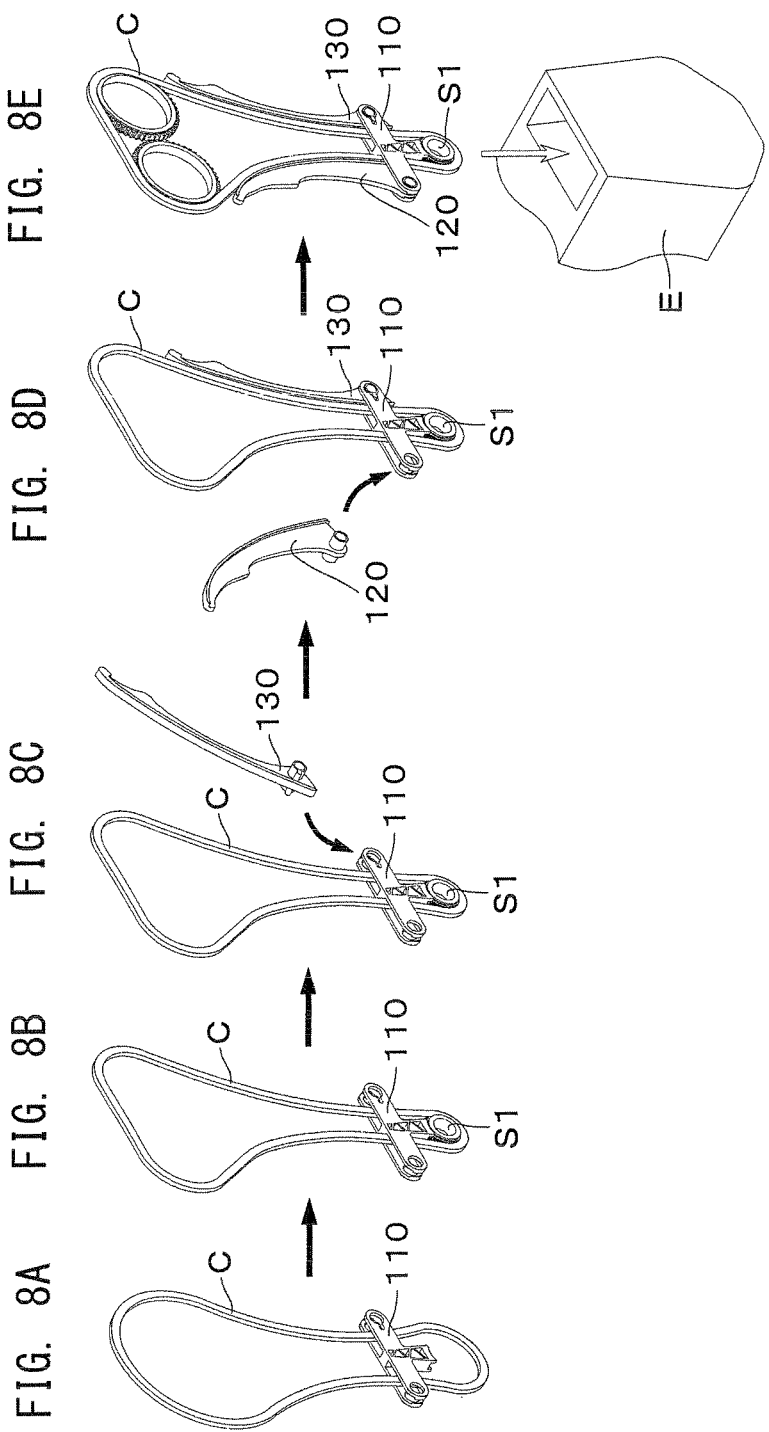
FIGS. 8A through 8E illustrate successive steps in the assembly the chain guide mechanism of an embodiment of the invention.

In the assembly of the timing system, the guide bridge 110 is first positioned with its base situated between the opposite sides of the chain C. These opposite sides of the chain extend respectively between opposed parts of each of the arms of the guide bridge, as shown in FIG. 8A. The driving sprocket S1 is then engaged with the chain and the chain is pulled so that sprocket pressing structure 140 at the end of the base portion 113 abuts the bosses on both sides of the sprocket, as shown in FIG. 8B. The guide bridge 110 is thus secured to the driving sprocket S1 by the timing chain C.

Next, the fixed chain guide 130 and the movable chain guide 120 are inserted into the spaces between the opposed parts of the arms 111. By a slight bending of the opposed parts of the arms, the bosses 121 and 131 (FIGS. 3 and 4) can be inserted into the guide mounting holes 112 as shown in FIGS. 8C and 8D, so that the fixed and movable guides 130 and 120 are integrated with the assembly comprising the drive sprocket, the chain and the guide bridge.

At this time, the projections 133 on the outer circumference of the mounting bosses 131 of the fixed chain guide 130 are received in the notches 115 in the guide mounting holes 112, thereby to securing fixed chain guide 130 against rotation about the axis of the notched mounting holes 112.

The assembly comprising the timing chain, the driving sprocket, the guide bridge, and the fixed and movable guides can be handled as a unit during installation on, or removal from, an engine block E as shown in FIG. 8E. The integration of these components greatly facilitates assembly and maintenance of the timing drive.

Figure 9:
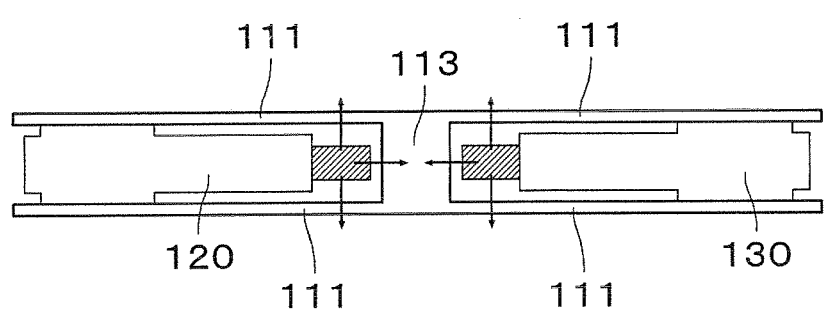
FIG. 9 is a cross-section view of the chain guide mechanism of one embodiment of the invention when assembled.
Figure 10:
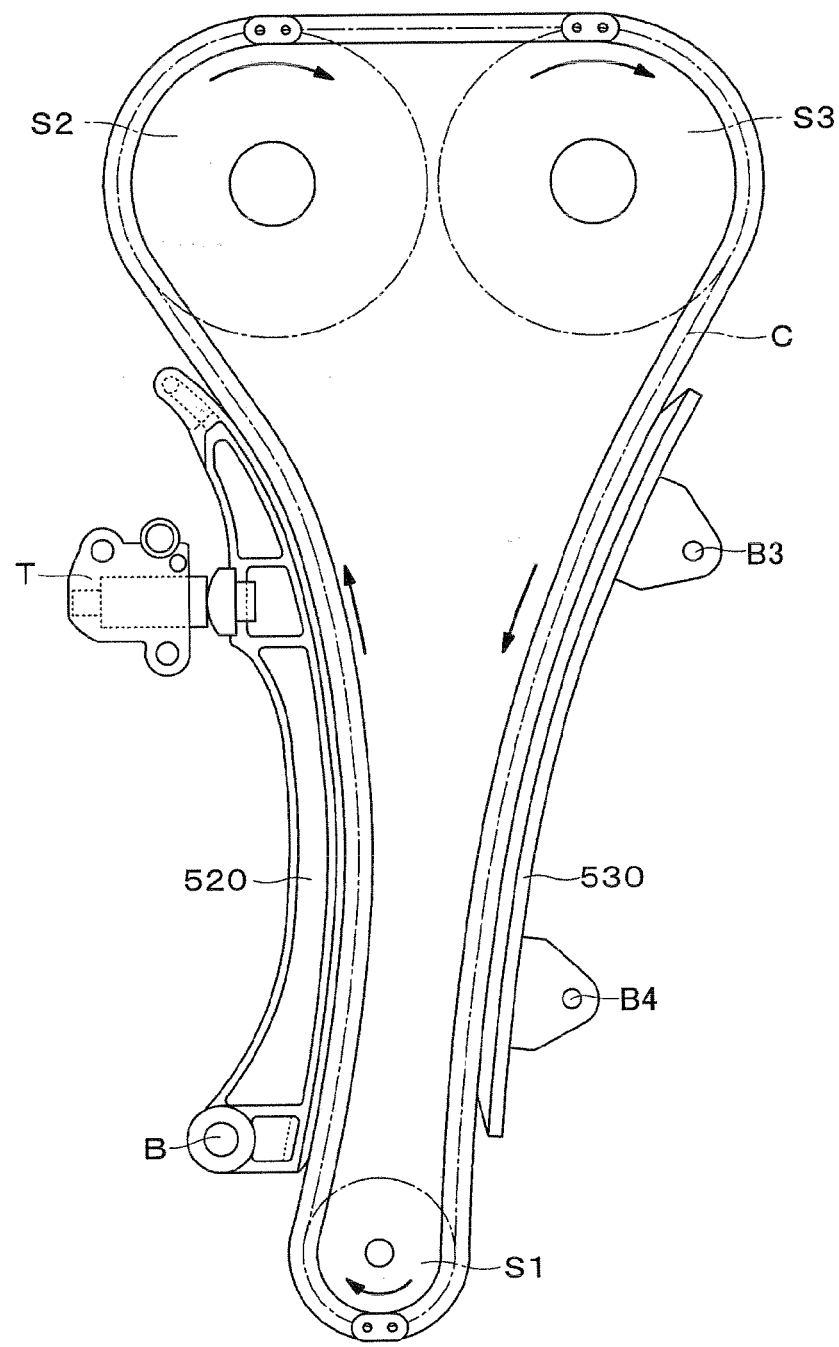
FIG. 10 is a schematic front elevational view of a timing drive incorporating a conventional chain guide mechanism.

In addition, because the timing chain C is disposed within spaces between opposed parts of the arms of the guide bridge, each of two parts of the chain passes through a space bounded by the base portion 113 of the guide bridge, the opposed parts of an arm 111 of the guide bridge, and a guide 120 or 130, as shown in FIG. 9. The base portion 113 and the arms 111 of the guide bridge restrict movement of the chain in the directions of the arrows in FIG. 9 while the guides restrict outward movement of the chain. Thus, the bridge functions as a guide capable of stabilizing the travel of the timing chain C when the chain meanders or vibrates.

Figure 11:
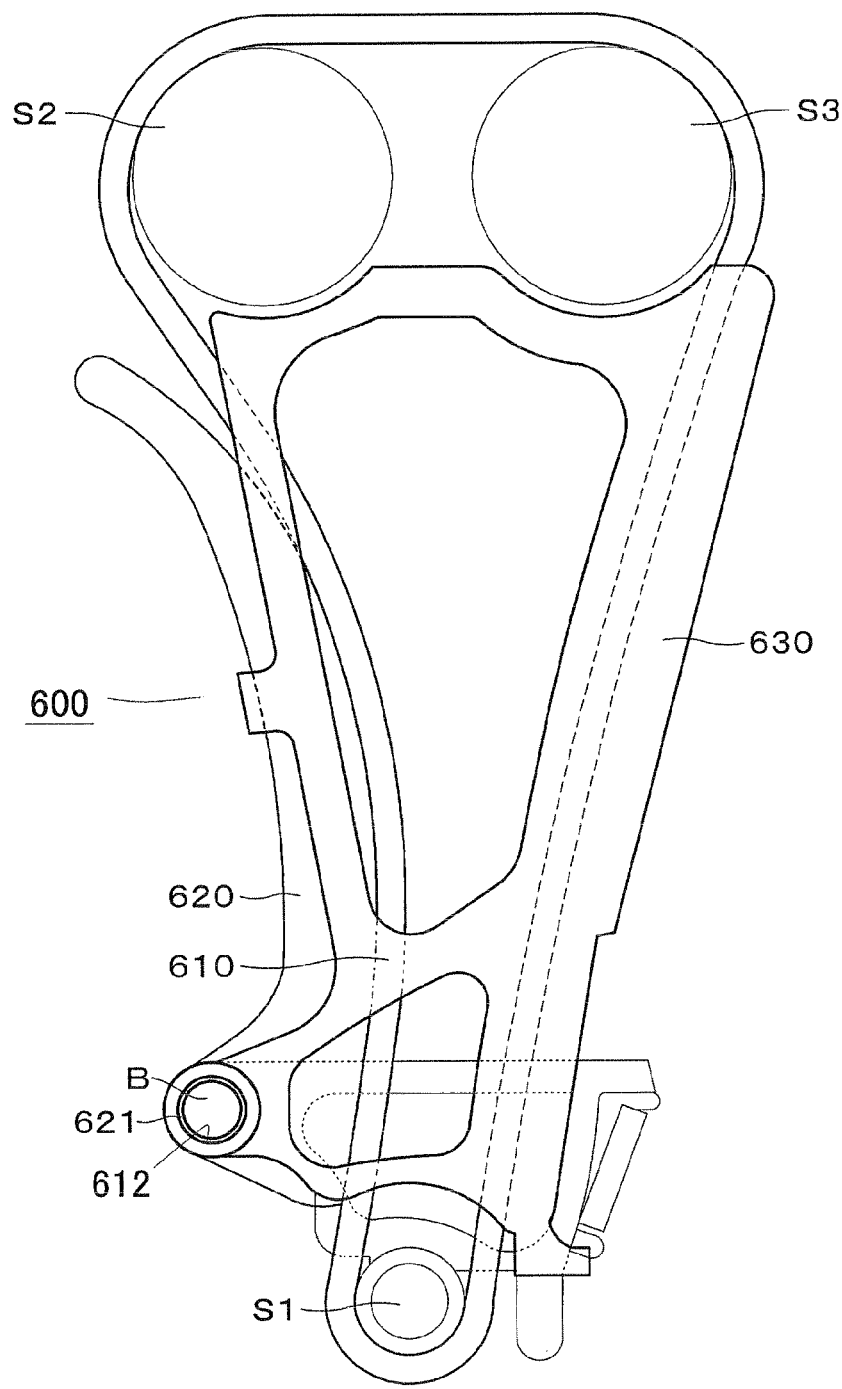
FIG. 11 is a schematic front elevational view of a timing drive incorporating another prior art chain guide mechanism, in which the fixed and movable guides are connected by a bridge.
Figure 12:
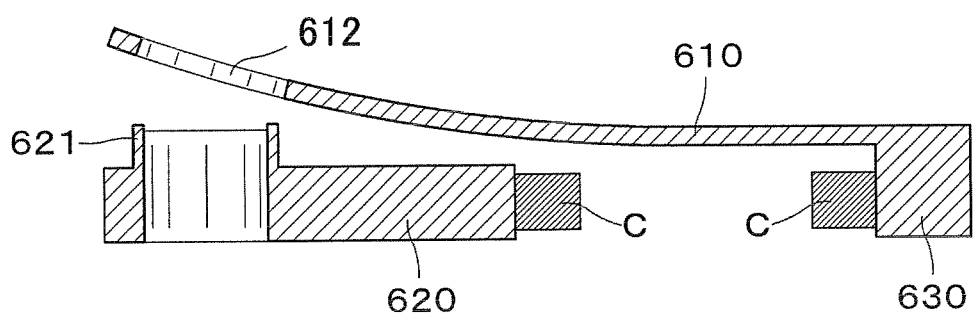
FIG. 12 is a cross-sectional view illustrating how the pivoted chain guide in the chain guide mechanism of FIG. 11 can become disengaged from the guide bridge.

Because the guide bridge 110 is located near the driving sprocket S1, its size can be reduced, and it can be manufactured readily and exhibit improved dimensional accuracy. The guide bridge 110 does not hamper lubrication of the chain or impede dissipation of heat from the timing system. The opposed parts of arms 111 on both sides of the base portion 113 are short in comparison to the arms on the conventional guide bridge of FIGS. 11 and 12, and can therefore be light in weight, but at the same time sufficiently resilient to permit attachment of the fixed and movable guides to the guide bridge but sufficiently stiff to avoid accidental disengagement of the guides from the guide bridge as a result of deformation of the arms.

The distance between the guide mounting holes 112 and the guide deviation preventing projections 114 on the side of the base portion on which the fixed chain guide 130 is located can be different from the corresponding distance on the side on which the movable guide is located. In addition, the shape of the arm that receives the fixed chain guide 130 can be made different from the shape of the arm that receives the movable chain guide 120 to avoid errors in assembly of the chain guide mechanism.

Although arms 111 extend at right angles to the base portion 113, in modified versions of the guide bridge, they can extend at angles other than right angles. The arms can also have parts extending in the direction of travel of the timing chain. The widths of the arms can be modified, as can their shapes.

As mentioned above, the chain guide mechanism of the invention facilitates assembly and maintenance by allowing by allowing a plurality of parts to be integrally held together by a simple structure when apart from an engine block.

It is also possible to reduce manufacturing costs by adapting the guide mounting holes 112 of the guide bridge to receive mounting bosses of existing movable and fixed chain guides. Alternatively, the mounting bosses of the chain guides can be adapted to the guide mounting holes 112.

The chain guide mechanism of the invention can take any of a wide variety of forms, provided that it incorporates a plurality of chain guides for sliding relationship with a chain, and the guide bridge for integrally holding the plurality of chain guides has arms for holding the chain guides and a base portion between the arms, and each arm extending from the base portion comprises two opposed parts spaced from each other with a chain guide sandwiched between them, and the opposed parts have guide mounting holes for receiving mounting bosses of the chain guides, and provided that the chain guide mechanism firmly integrates the plurality of chain guides, the chain, and a sprocket in a simple structure that facilitates assembly and maintenance.

A chain guide of the chain guide mechanism of the invention can be movable chain guide for maintaining tension, e.g., a tensioner lever, or may a fixed chain guide. In each guide, the surface on which the chain slides can be a unitary part of a molded guide, composed of a material having a favorable sliding characteristic, or the surface can be the surface of a shoe removably attached to a supporting member.

The chain guide mechanism of the invention may be formed from any of a wide variety of materials as long the surfaces on which the chain slides exhibit low frictional resistance to the chain. Suitable materials that exhibit durability in high-temperature environments and that can achieve smooth sliding contact with a traveling chain include synthetic resin materials such as polyamide 6 resin, polyamide 46 resin, polyamide 66 resin, polyacetal resin, and the like.

Because the guide bridge, which is used integrally with the chain guides, can also come into contact with the chain, it is desirable to form the guide bridge of a low frictional resistance material on which a chain can slide smoothly, and which exhibits durability in a high-temperature environment. Thus, it is preferable to use the same material to form the chain guides and the guide bridge.

What is claimed is:

1. A chain guide mechanism comprising:
a plurality of chain guides for sliding relationship with a traveling chain; and
a guide bridge for integrally holding the plurality of chain guides;
wherein:
said guide bridge has a base portion, and a pair of arms extending from the base portion;
each of said arms comprises two opposed, spaced parts extending on opposite sides of one of the chain guides whereby a portion of one of said chain guides is disposed between the opposed parts of each of said arms;
a pair of cylindrical mounting bosses extends in opposite directions from each said portion of a chain guide;

each of said opposed, spaced parts is formed with a guide mounting hole for receiving a mounting boss on the chain guide portion therebetween, and one of said chain guides is provided with a projection on the outer circumference of at least one of its cylindrical mounting bosses the guide mounting hole receiving said one of said cylindrical mounting bosses is formed with a notch that mates with said projection whereby rotation of said one of said chain guides relative to the guide bridge is prevented.

2. A chain guide mechanism comprising:

a plurality of chain guides for sliding relationship with a traveling chain; and a guide bridge for integrally holding the plurality of chain guides;

wherein:

said guide bridge has a base portion, and a pair of arms extending from the base portion;

each of said arms comprises two opposed, spaced parts extending on opposite sides of one of the chain guides whereby a portion of one of said chain guides is disposed between the opposed parts of each of said arms;

a pair of cylindrical mounting bosses extends in opposite directions from each said portion of a chain guide;

each of said opposed, spaced parts is formed with a guide mounting hole for receiving a mounting boss on the chain guide portion therebetween, and each of the opposed parts of each arm of the guide bridge has a guide deviation preventing projection that projects toward the opposite part of the arm.

3. A chain guide mechanism comprising:

a plurality of chain guides for sliding relationship with a traveling chain; and a guide bridge for integrally holding the plurality of chain guides;

wherein:

said guide bridge has a base portion, and a pair of arms extending from the base portion;

each of said arms comprises two opposed, spaced parts extending on opposite sides of one of the chain guides whereby a portion of one of said chain guides is disposed between the opposed parts of each of said arms;

a pair of cylindrical mounting bosses extends in opposite directions from each said portion of a chain guide;

each of said opposed, spaced parts is formed with a guide mounting hole for receiving a mounting boss on the chain guide portion therebetween, and the base portion of said guide bridge and the arms thereof are in the form of a T, and the base has a sprocket pressing structure that comprises a pair of surfaces for engagement with boss portions of a sprocket, and a groove separating said surfaces for receiving sprocket teeth.

* * * * *